(12) United States Patent
Forster

(10) Patent No.: US 9,727,812 B2
(45) Date of Patent: Aug. 8, 2017

(54) RFID DEVICE WTIH CONTROL LOGIC, AND METHOD

(75) Inventor: Ian J. Forster, Essex (GB)

(73) Assignee: AVERY DENNISON RETAIL INFORMATION SERVICES, LLC, Westborough, MA (US)

( * ) Notice: Subject to any disclaimer, the term of this patent is extended or adjusted under 35 U.S.C. 154(b) by 1023 days.

(21) Appl. No.: 11/781,322

(22) Filed: Jul. 23, 2007

(65) Prior Publication Data

US 2009/0027173 A1    Jan. 29, 2009

(51) Int. Cl.
*H04B 7/00* (2006.01)
*G06K 19/07* (2006.01)
*G06K 19/077* (2006.01)

(52) U.S. Cl.
CPC ..... *G06K 19/0723* (2013.01); *G06K 19/0717* (2013.01); *G06K 19/07767* (2013.01)

(58) Field of Classification Search
CPC ........... G06K 19/0723; G06K 19/0717; G06K 19/07767; G06K 19/00; G06K 19/0712; G06K 19/0716; G06K 19/0724; G06K 19/0726; G06K 19/0775; G06K 19/07766; G06K 19/07773; H01Q 3/28; H01Q 3/44; H01Q 5/00; H01Q 5/28; H01Q 9/0428; H01Q 9/0492; H01Q 9/045; H01Q 9/06; H01Q 13/0241; H01Q 15/00; H01Q 15/24; H01Q 15/244; H03C 1/00; H03C 1/08; H03C 7/00; H03C 7/04; H03G 1/00;

(Continued)

(56) References Cited

U.S. PATENT DOCUMENTS 4,818,855 A    4/1989  Mongeon et al.
5,572,226 A  * 11/1996  Tuttle .............................. 343/726
(Continued)

FOREIGN PATENT DOCUMENTS

| EP | 1431904 | 6/2004 |
| EP | 1519306 | 3/2005 |
| GB | 2406023 | 3/2005 |

OTHER PUBLICATIONS

Hutchinson, RFID Standards Update, 2005, RFID Journal Live!, slide 16.*

(Continued)

*Primary Examiner* — Brian Wilson
(74) *Attorney, Agent, or Firm* — Avery Dennison Retail Information Services, LLC

(57) ABSTRACT

A radio frequency identification (RFID) device has controllable features that allow for modification of its interaction with external devices, such as RFID readers. The RFID device may have multiple antennas, coupled to multiple contacts of a chip of the device. The chip may include a real or virtual switch for selectively coupling the chip to either of the antennas. The switch may be activated by an external signal sent to the RFID device. The RFID device also may be controlled by adjusting an adjustable modulator within the RFID device. The modulator may adjust outgoing signals from the RFID device to an appropriate level of signal strength, or to have other suitable characteristics. By control of the antenna couplings and/or the modulator settings of the RFID device, adjustments in performance of the RFID device may be made for suitable operation in a variety of situations and environments.

7 Claims, 4 Drawing Sheets

(58) Field of Classification Search
CPC .......... H03G 1/0035; H04B 7/00; H04B 7/04; H04B 7/602; H04B 7/604; H04B 7/608; H04B 7/10
USPC .......................... 340/572.1–572.9, 10.1–10.6
See application file for complete search history.

(56) References Cited

U.S. PATENT DOCUMENTS

| | | | |
|---|---|---|---|
| 5,640,003 | A | 6/1997 | Makino |
| 6,025,780 | A | 2/2000 | Bowers et al. |
| 6,040,773 | A | 3/2000 | Vega et al. |
| 6,107,920 | A | 8/2000 | Eberhardt et al. |
| 6,181,287 | B1 | 1/2001 | Beigel |
| 6,206,292 | B1 | 3/2001 | Robertz et al. |
| 6,252,508 | B1 | 6/2001 | Vega et al. |
| 6,262,692 | B1 | 7/2001 | Babb |
| 6,496,112 | B1 | 12/2002 | Vega |
| 6,525,648 | B1 | 2/2003 | Kubler et al. |
| 6,734,797 | B2 | 5/2004 | Shanks et al. |
| 6,784,813 | B2 | 8/2004 | Shanks et al. |
| 6,946,958 | B2 * | 9/2005 | Gundlach et al. ........ 340/539.21 |
| 7,026,935 | B2 * | 4/2006 | Diorio et al. ............... 340/572.2 |
| 7,030,731 | B2 | 4/2006 | Lastinger et al. |
| 7,102,523 | B2 | 9/2006 | Shanks et al. |
| 7,116,212 | B2 | 10/2006 | Horwitz et al. |
| 7,145,482 | B2 | 12/2006 | Shanks et al. |
| 7,183,926 | B2 | 2/2007 | Diorio et al. |
| 7,912,442 | B2 * | 3/2011 | Rotzoll ...................... 455/343.2 |
| 7,949,373 | B2 * | 5/2011 | Whiting ....................... 455/557 |
| 2004/0074975 | A1 | 4/2004 | Gundlach et al. |
| 2004/0263319 | A1 | 12/2004 | Huomo |
| 2005/0099269 | A1 * | 5/2005 | Diorio et al. .............. 340/10.51 |
| 2005/0140816 | A1 * | 6/2005 | Tschida et al. ................ 348/360 |
| 2005/0212674 | A1 | 9/2005 | Desmons et al. |
| 2005/0274799 | A1 * | 12/2005 | Torchalski et al. ........... 235/432 |
| 2006/0012464 | A1 | 1/2006 | Nitzan et al. |
| 2006/0066451 | A1 | 3/2006 | Nemoto et al. |
| 2006/0071756 | A1 | 4/2006 | Steeves |
| 2006/0267733 | A1 * | 11/2006 | Steinke et al. ................ 340/10.1 |
| 2007/0152829 | A1 | 7/2007 | Lindsay et al. |
| 2007/0152830 | A1 | 7/2007 | Burr |
| 2007/0210923 | A1 * | 9/2007 | Butler .................. G06K 7/0008 340/572.8 |
| 2007/0229278 | A1 * | 10/2007 | Nagata et al. ............. 340/572.7 |
| 2008/0018433 | A1 * | 1/2008 | Pitt-Pladdy ................. 340/10.4 |
| 2008/0042848 | A1 * | 2/2008 | Roberts .................. B60R 13/10 340/572.7 |
| 2008/0084310 | A1 * | 4/2008 | Nikitin .................. G06K 7/0008 340/572.7 |
| 2008/0136646 | A1 * | 6/2008 | Friedrich ................... 340/572.7 |

OTHER PUBLICATIONS

International Search Report and Written Opinion from corresponding International Application No. PCT/US08/70704.
Claims from related U.S. Appl. No. 11/781,321.
Applicant's Reply to the Written Opinion of the ISA and Transmittal of Chapter II Demand dated May 22, 2009, filed in corresponding IA No. PCT/US2008/070704.
International Preliminary Report on Patentability dated Oct. 8, 2009, issued in corresponding IA No. PCT/US2008/070704.
Applicant's Reply to the International Preliminary Report on Patentability dated Oct. 28, 2009, issued in corresponding IA No. PCT/US2008/070704.

* cited by examiner

RFID DEVICE WTIH CONTROL LOGIC, AND METHOD

BACKGROUND OF THE INVENTION

Field of the Invention

This invention relates to the field of radio frequency identification (RFID) devices, and methods of controlling RFID devices.

Description of the Related Art

Radio frequency identification (RFID) tags and labels (collectively referred to herein as "devices") are widely used to associate an object with an identification code. RFID devices generally have a combination of antennas and analog and/or digital electronics, which may include for example communications electronics, data memory, and control logic. For example, RFID tags are used in conjunction with security-locks in cars, for access control to buildings, and for tracking inventory and parcels. Some examples of RFID tags and labels appear in U.S. Pat. Nos. 6,107,920, 6,206,292, and 6,262,692.

As noted above, RFID devices are generally categorized as labels or tags. RFID labels are RFID devices that are adhesively or otherwise have a surface attached directly to objects. RFID tags, in contrast, are secured to objects by other means, for example by use of a plastic fastener, string or other fastening means.

RFID devices include active tags and labels, which include a power source, and passive tags and labels, which do not. In the case of passive tags, in order to retrieve the information from the chip, a "base station" or "reader" sends an excitation signal to the RFID tag or label. The excitation signal energizes the tag or label, and the RFID circuitry transmits the stored information back to the reader. The "reader" receives and decodes the information from the RFID tag. In general, RFID tags can retain and transmit enough information to uniquely identify individuals, packages, inventory and the like. RFID tags and labels also can be characterized as to those to which information is written only once (although the information may be read repeatedly), and those to which information may be written during use. For example, RFID tags may store environmental data (that may be detected by an associated sensor), logistical histories, state data, etc.

It will be appreciated that it would be advantageous to have RFID devices that can be utilized in a wide variety of conditions and situations.

SUMMARY OF THE INVENTION

According to an aspect of the invention, an RFID device has a chip coupled to two antennas, with a real or virtual antenna control switch to select which of the antennas is used for sending and receiving signals.

According to another aspect of the invention, an RFID device has a chip coupled to two antennas, with the chip able to selectively activate the coupling to one or another of the antennas.

According to another aspect of the invention, an RFID device includes an adjustable modulator for adjusting characteristics of outgoing signals. Adjustable characteristics of the outgoing signals may include characteristics such as data rate of the signal, strength of the outgoing signal, or the strength of reflective modulation of the signal. The adjustable modulator may include on and off state impedances that may be switched to adjust the modulation of outgoing signals.

According to yet another aspect of the invention, a radio frequency identification (RFID) device includes: a chip having a first set of contacts and a second set of contacts; a first antenna coupled to the first set of contacts; and a second antenna coupled to the second set of contacts. The chip selectively activates either the first set of contacts or the second set of contacts.

According to still another aspect of the invention, a method of controlling a radio frequency identification (RFID) device includes the steps of: sending an antenna-selecting signal to the RFID device, wherein the antenna-selecting signal causes a chip of the RFID device to selectively activate a connection between the chip and one of a pair of antennas of the RFID device that are connected to the chip; and communicating with the RFID device through the antenna indicated by the antenna-selecting signal.

According to a further aspect of the invention, a method of controlling a radio frequency identification (RFID) device includes the steps of: sending an antenna-selecting signal to the RFID device; and using the antenna-selecting signal to control connection of a chip of the RFID device to one of a pair of antennas of the RFID device.

According to a still further aspect of the invention, a radio frequency identification (RFID) that includes: a chip; and an antenna coupled to the chip for receiving and sending signals. The chip includes control logic that controls outgoing signals sent by the RFID device at least in part based on one or more of 1) a non-informational characteristic of incoming signals received by the RFID device, and 2) environment information received by an environment sensor of the RFID device.

According to another aspect of the invention, a method of controlling a radio frequency identification (RFID) device includes the steps of: receiving an incoming signal at the RFID device; and controlling outgoing signals sent from the RFID device based at least in part on a non-informational characteristic of the incoming signal.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale.

DETAILED DESCRIPTION

A radio frequency identification (RFID) device, such as an RFID tag or an RFID label, has controllable features that allow for modification of its interaction with external devices, such as RFID readers. The RFID device may have multiple antennas, coupled to multiple contacts of a chip of the device. The chip may include a real or virtual switch for selectively coupling the chip to either of the antennas. The switch may be activated by an external signal sent to the RFID device. Alternatively, the switch may be activated by other factors, such as non-informational characteristics of received signals (e.g., signal strength), or by information from a sensor of the RFID device used for sensing one or more aspects of the external environment around the RFID device. The RFID device also may be controlled by adjusting an adjustable modulator within the RFID device. The modulator may adjust outgoing signals from the RFID device to an appropriate level of signal strength, or to have other suitable characteristics. Adjustments in the modulator may be made based on one or more of a variety of factors, using logic within the chip of the RFID device. These factors may include commands sent from external devices such as RFID readers, non-informational parameters from incoming signals, and information received from external environment sensors of the RFID device. By control of the antenna couplings and/or the modulator settings of the RFID device, adjustments in performance of the RFID device may be made for suitable operation in a variety of situations and environments.

Figure 1A:
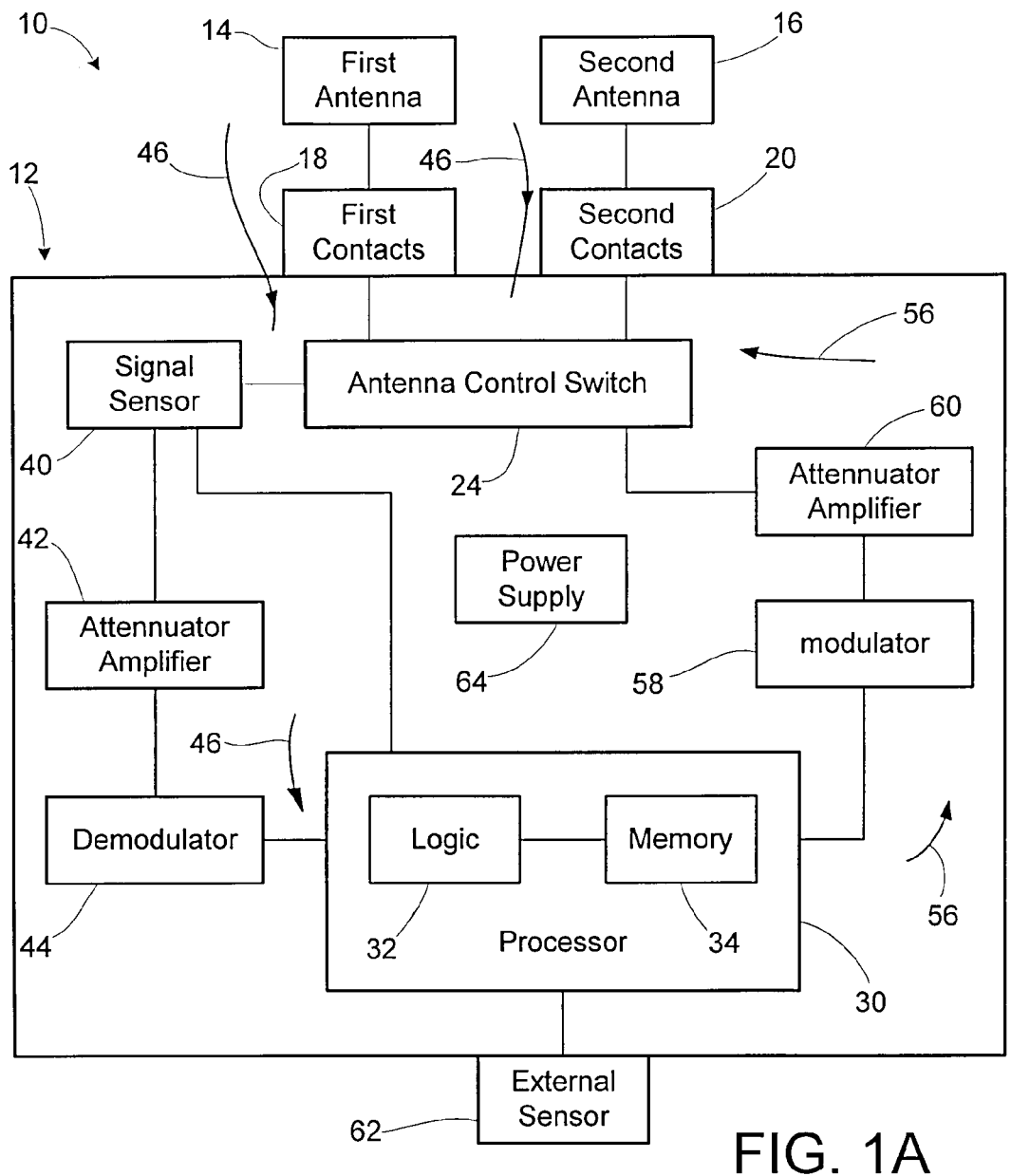
FIG. 1A is a schematic functional diagram of a controllable RFID device in accordance with an embodiment of the present invention.

Referring initially to FIG. 1A, a radio frequency identification (RFID) device 10 includes a chip 12 that is coupled to a first antenna 14 and a second antenna 16. The first antenna 14 is coupled to the chip 12 at first contacts 18 of the chip 12. The second antenna 16 is coupled to second contacts 20 of the chip 12. The contacts 18 and 20 are both coupled to a real or virtual antenna control switch 24 of the chip 12.

The antenna control switch 24 selectively couples the other components of the chip 12 to either the first contacts 18 or the second contacts 20. The antenna control switch 24 may be a real switch or a virtual switch. That is, the antenna control switch 24 may be an actual physical switch, or alternatively may be a virtual switch that performs the function of selectively coupling one of the contact sets 18 and 20 to other parts of the chip 12. The virtual switch may be circuitry or a changeable state of the chip 12 that controls whether information is received and/or sent to the contacts 18 and/or 20, and/or whether and how information received through either or both sets of contacts 18 and 20 is processed. The control switch 24, whether an actual physical structure or a virtual switch, controls the mode in which the device 10 operates in.

In the explanation below, the antenna control switch 24 is described as a physical switch, such as an analog switch. However, it will be appreciated that each set of the contacts 18 and 20 may alternatively have its own demodulation/modulation circuit as part of the chip 12.

The antenna control switch 24 is operatively coupled to a processor 30, which controls the antenna control switch 24. The processor 30 includes control logic 32 and an internal memory 34. The control logic 32 includes logic for selectively activating the antenna control switch 24 so that the chip 12 communicates through either the first contacts 18 or the second contacts 20. In addition, the control logic 32 may be used for any of a variety of other suitable functions for the chip 12. The well-known and conventional functions performed by the processor 30 may include sending identification information, such as an identification code associated with the RFID device 10 and stored in the memory 34. The memory 34 may include read-only memory and/or read/write memory.

The chip 12 also includes a signal characteristic sensor 40, an attenuator/amplifier 42, and a demodulator 44. The attenuator/amplifier 42 and the demodulator 44 are standard components used for processing incoming signals. The signal characteristic sensor 40 is used for measuring non-informational characteristics of incoming signals, such as the voltage or other measure of signal strength, or the data rate of the incoming signal. The term "non-informational characteristics," as used herein, is intended to describe characteristics of incoming signals that are separate from any instructions or other information that is intended to be imparted in such signals. Non-informational characteristics include characteristics as signal strength or voltage of the signal, data rate of the signal, and the data coding scheme or protocol of the signal. The signal characteristic sensor 40 is not a necessary part of the chip 12, or necessarily a separate part of the chip 12. The sensor 40 may be omitted from the chip 12 if desired, perhaps with its functions performed by other parts of the chip 12.

Another non-information characteristic is detection of beat frequencies resulting from simultaneous illumination from multiple reader sources. For example, in a portal, the two reader systems on either side may not be synchronized in frequency. That is they may be hopping over a predefined set of channels. Beat frequencies are the result of the signals from two or more readers interacting in the detector of the tag. For example, two readers transmitting 1 MHz apart will produce a "signal" at 1 MHz in the chip input circuit. In fact, even readers nominally at the same frequency will produce a lower frequency beat, due to the inaccuracy of the transmission frequency. For example, although two readers may nominally be at 915 MHz, they could actually be 915.001 and 915.008, giving a 7 kHz beat. The presence of this beat frequency provides an indication to the device 10 of the sort of environment the device 10 is responding in. The device 10 may be configured to adapt its behavior for such an environment, in any of the ways previously described, to optimize the chances of a successful communication.

Incoming signals 46 are received by whichever of the antennas 14 and 16 is connected by the antenna control switch 24. The incoming signals 46 then pass through the signal characteristic sensor 40, the attenuator/amplifier 42, and the demodulator 44, before the processed incoming signals reach the processor 30. Non-informational characteristics of the incoming signals 46 may also be determined by the signal characteristic sensor 40, with information on the non-informational characteristics forwarded to the processor 30 for use in controlling the RFID device 10, in particular by controlling operations within the chip 12.

It will be appreciated that the determinations of non-information signal characteristics from the incoming signals 46 may be made in a separate signal characteristic sensor 40, or alternatively may be made within the processor 30. The non-informational characteristics of the incoming signals 46 may be determined either from raw signals that have not been attenuated and demodulated, or in the process signals that have passed through the attenuator/amplifier 42 and the demodulator 44.

Figure 1B:
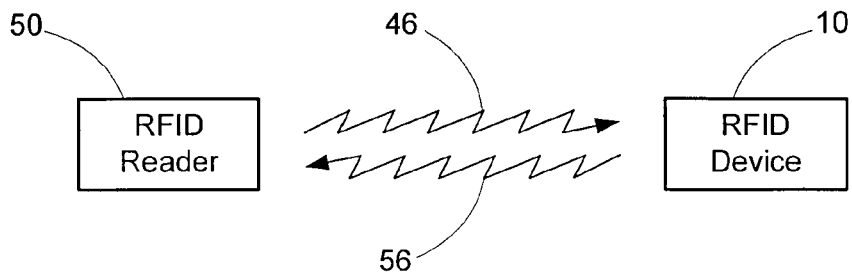
FIG. 1B is a schematic illustration of communication between the RFID device of FIG. 1A and an RFID reader.

With reference now in addition to FIG. 1B, information from the incoming signals 46 may be used within the processor 30 for communication with external devices, such as an RFID reader 50. Outgoing signals 56 from the RFID device 10 originate in the processor 30. The outgoing signals 56 pass through an adjustable modulator 58 and an outgoing signal attenuator/amplifier 60. The adjustable modulator 58 may be controlled by the processor 30 to control characteristics of the outgoing signals 56. An example of a characteristic controllable by the adjustable modulator 58 is the signal strength of the outgoing signals 56. The outgoing signals 56 then pass from the attenuator/amplifier 60, through the antenna control switch 24, and to whichever of the contacts 18 and 20 is selected by the antenna control switch 24. The outgoing signals 56 are then transmitted using the appropriate of the antennas 14 and 16. The outgoing signals 56 may be used as part of a communication between the RFID device 10 and the RFID reader 50.

The adjustable modulator 58 may also broadly control the modulation of the impedance of the chip 12, as another characteristic controllable by the adjustable modulator 58. The modulator 58 changes the impedance of the chip 12 from a receive state impedance to one or more reflect state impedances. The antenna is usually configured to optimize power transfer when the chip 12 is in the receive state, although some impedance mismatch may be deliberately built in. Shifting between a receive state impedance and a reflect state impedance generates a reflected signal, such as a bit of a longer signal string. This change of state can involve a change of amplitude of the reflected signal and/or a change of phase.

The use of multiple reflect state impedances allows multiple states which are highly reflective relative to an antenna. This allows more energy to be put into reflecting a returned signal. One possibility is that the modulator 58 actually changes the impedance during the transmission of a bit. Rather than changing for between two reflect state impedances when the modulator data stream changes from 0 to 1, the impedance may go through one or more intermediate stages, with intermediate impedances, smoothing the transition between the reflect state impedances. This would be desirable in environments with tighter radio regulations, such as in Europe. This is because the smoother transition causes less generation of harmonics of the main frequency components of the modulating waveform, constraining the bandwidth occupied by the transmission. However the use of intermediate impedances may increase energy consumption. Therefore it may be desirable to not utilize intermediate impedances where regulations covering radio transmissions are less constraining, such as in the United States.

Another possibility is that the phase and amplitude of the multiple reflect state impedances may be selected so that the reflected signal has a substantially single side-band response. The change in impedances caused by the modulator 58 have both amplitude and phase components. The upper and lower sideband generated by a phase modulation and amplitude modulation process are of opposite phase. If balanced correctly, the sidebands will cancel. In countries/regions with more constraining radio regulations the ability to re-radiate a substantially single sideband response may be beneficial.

Finally, the adjustable modulator 58 may control the data phase/delay of the digital signal driving two or more modulators on the chip 12. This control of the baseband phase, combined with control of RF phase and amplitude of the reflection states, can cause a number of changes in the response of a device when combined with appropriate RF antenna characteristics. The modulator 58 may be able to adjust the relative level of the upper and lower sideband generated. In addition, with an appropriate antenna, the modulator 58 may be able to change the circularity of the reflected signal, for example to allow left or right hand circularly polarized signals to be re-radiated.

The RFID device 10 may also include an external sensor 62 for sensing one or more parameters of the environment in the vicinity of the RFID device 10. As one example, the external sensor 62 may be a temperature sensor for sensing temperature. As another example, the external sensor 62 may be a humidity sensor for sensoring humidity. A further example for the external sensor 62 would be a pressure sensor. It will be appreciated that the external sensor 62 may sense any of a wide variety of physical or chemical properties of the environment surrounding the RFID device 10. Other examples include sensors for sensing electrical fields, magnetic fields, or the presence of certain chemicals, light sensors, and sound-sensing devices. The external sensor 62 is coupled to the processor 30 to enable the processor 30 to utilize information from the external sensor 62 as part of the process of controlling operation of the chip 12. The external sensor 62 may be a part of the chip 12, such as by being micro-machined part of the chip 12. Alternatively, the sensor 62 may be a separate part of the RFID device 10.

The chip 12 may include a power supply 64 for powering the various components described above. The power supply 64 may be considered optional, as the RFID device 10 may be a passive RFID device, a semi-passive RFID device, or an active RFID device, or an active RFID device. As suggested by the above description, the processor 30 may be used to control the characteristics of the outgoing signals 56 including when and whether the outgoing signals 56 are even sent.

The antenna control switch 24 may be controlled to select which of the antennas 14 and 16 is used for communicating with devices external to the RFID device 10. Alternatively or in addition, the adjustable modulator 58 may be set to provide desired characteristics for the outgoing signals 56. This adjustment of the modulator 58 may be used to control the signal strength, data rate, or other characteristics of the outgoing signals 56. The processor 30 may utilize any of a wide variety of inputs in controlling the antenna control switch 24 and/or the adjustable modulator 58. The inputs may be in informational parts of the incoming signals 46, either in special separate signals or included as parts of signals or other interactions between the RFID device 10 and the RFID reader 50 or other devices. Another potential input for the processor 30 in controlling the antenna control switch 24 and/or the adjustable modulator 58 is non-informational parameters from the incoming signals 46, determined by the signal characteristic sensor 40 and forwarded in one form or another to the processor 30. A third possible input in controlling the antenna control switch 24 and/or the adjustable modulator 58 is information about the external environment around the RFID device 10 received by the external sensor 62.

The control logic 32 of the processor 30 may use a decision tree, decision table, decision matrix, flow chart, or other suitable algorithm to use data from any or all of the sources, in controlling the antenna control switch 24 and/or the adjustable modulator 58. In addition it will be appreciated that the memory 34 may have additional preprogrammed or saved pieces of data that may be used by the control logic 32 in the controlling functions performed by the processor 30. It will be appreciated that there is a large range of variability with regard to the types and complexity of operations performed by the control logic 32.

On the simple end of the range, a control operation performed by the processor 30 may involve a simple Boolean function based on a single input. For instance, the control logic 32 may direct the antenna control switch 24 to couple to either the first contacts 18 or the second contacts 20 whenever a corresponding instruction signal is received by the RFID device 10. The two different antennas 14 and 16 may be configured for different types of operations. One of the antennas 14 and 16 may be configured for relatively long range, far-field operation, while the other of the antennas 14 and 16 may be configured for relatively short range, near-field operation. The far field, as used herein, refers to a distance from the RF-energy emitting device greater than about $\lambda/2\pi$, where $\lambda$ is the wavelength of the RF energy. Coupling of an RFID device in the far field may also be referred to as "long-range coupling." The near field, where short-range coupling may occur, is defined as at a distance within about $\lambda/2\pi$. For RF of energy of 915 MHz, the boundary between the near field and the far field would be about 52 mm from the device, using this definition.

The antennas 12 and 14 may be of any of a wide variety of types of antennas, including loop antennas, slot antennas, dipole antennas, and hybrids and combinations of these types of antennas. The antennas 12 and 14 may be of different types, or may be of the same type. The antennas 12 and 14 may have different characteristics, such as differences in conductive material thickness, width, and/or layout.

Instructions in incoming signals 46 may be used to instruct the RFID device 12 to utilize one or the other of the antennas 14 and 16. There are many possible reasons for desiring one or the other of near-field and far-field operation, and for having the capability of selectively configuring the RFID device 10 for one mode of operation or the other. Examples of reasons include the density of RFID devices in a given area, and the relative proximity of surfaces or materials that may interfere with operation of RFID devices. By providing separate antennas that are selectively activated for communication, the RFID device 10 may have better operating performance over a wider range of possible conditions. It will be appreciated that a wide variety of other operating characteristics may be selectable by providing selectability between different antenna types. As an example, when tagged goods are being shipped from a distribution warehouse to a retail store, it would be advantageous to have the RFID devices of the tags set to receive and communicate using a far-field antenna. In a retail store, however, it may be desired to have the RFID devices 10 respond only on a near-field antenna, in order to avoid responding to RFID readers not in the immediate proximity of the RFID devices. Another alternative would be a situation where a carton or other container has its own RFID device and also contains many individual articles with their own respective RFID devices. While the articles are inside the carton or other container it may be advantageous to have only the carton RFID device responsive to far-field signals, with the individual RFID devices of the individual articles set to respond or communicate using their near-field antennas. It will be appreciated that an indication of container RFID devices versus individual article RFID devices may be provided in each of the containers and individual RFID devices. Such indications may be stored in the memories 34 of the RFID devices. The writing of such individual values to the memories 34 may be made during the fabrication or application of the individual RFID devices. It will thus be seen that there are many situations where it would be advantageous to have an RFID device with the capability of selection between a pair of antennas coupled to the device.

It will be appreciated that complex multi-factored decisions may also be used. Factors may be considered sequentially, such as in a decision tree. Factors may also be combined mathematically or otherwise.

As an alternative the antenna control switch 24 may have a setting that allows sending and receipt of signals on both of the antennas 14 and 16. As discussed elsewhere herein, it will be appreciated that the antenna control switch 24 may be a virtual "switch" that allows continuous receipt of signals from both of the antennas 14 and 16, but selectively activates communications with only one of the antennas 14 and 16 by only processing signals from one of the antennas 14 and 16.

The antenna described below is one of a set with desirable characteristics for electronic article surveillance (EAS). In addition to narrow bandwidth the antenna would also have a relatively high Q, so that a given amount of power will give a greater voltage across the chip. This will become increasingly important as chips are becoming limited by the minimum operating voltage of their rectifiers rather than the power needed.

It will be appreciated that the chip 12 may alternatively have more than two sets of contacts. Such a chip may also be able to couple to three or more antennas. A third type of antenna for coupling to the chip 12, in addition to the long range and short range antennas described above, could be an antenna to perform an EAS function at UHF frequencies. Such an EAS antenna might for example have a relatively narrow band but very high peak performance, giving good link margin for detecting objects being stolen. Such an antenna may be capable of long-range communication, but may be active only when a specific modulation (one selected to give optimum performance) is used at a store exit or a digital bit enabling EAS mode has been set. An EAS antenna is generally unsuitable for normal communications as the reader system is designed to rapidly hop through the operational frequency band, searching for narrrowband EAS mode tags, and would not have sufficient time at a single frequency to complete a full read function. This is because the RFID device's sensitivity changes so much with frequency that if the reader hops during communication it is likely to lose power.

An alternative form of antenna suitable for EAS applications would be one specifically designed to operate in close proximity to a person. As a person is a relatively high dielectric constant, the antenna may be effectively tuned high in frequency when in its normal state, but the proximity to a person tunes the antenna enabled for EAS functions down into the reader operating band.

Another form of antenna suitable for EAS would be one which gives an enhanced magnetic near field response. For such an antenna is to achieve a large enclosed area to get a large voltage at any given field strength.

Finally, another form of antenna suitable for the EAS function would be one incorporating self tuning or compensating features. Send characteristics tend to counteract the affect of proximity to a thief's body and any attempt at deliberate shielding.

As noted above, the antenna control switch 24 has been described in the illustrated embodiments as a physical switch, such as an analog switch. However, it will be appreciated that each set of the contacts 18 and 20 may alternatively have its own demodulation/modulation circuit coupled to the processor 30. Functions within the processor 30 may perform the switching function of the chip 12, providing modes of operation that activate one or the other of the contacts 18 and 20.

Another alternative for the RFID device 10 is control of the adjustable modulator 58 to control parameters of the output signals 56. It may be desirable to adjust the signal strength of the output signals 56 in order to provide an acceptable range of the output signals 56. For passive RFID devices in particular it is desirable that there be a limited maximum range at which the device is readable. The spectrum and level of reflected signals from passive RFID devices are limited by radio regulations, and these regulations are generally different in different countries or operating regions. The adjustable modulator 58 may have on and off state impedances that can be adjusted in order to change the characteristics of the outgoing signals 56. This adjustment of the modulator 58 may be in response to specific command signals received by the RFID device 10, and acted on by the processor 30. Alternatively, a logical process within the processor 30 may be used to set or adjust the adjustable modulator 58. This logical process may be based on the data rate and modulation type (or on other characteristics) of the incoming signals 46. Data rates and modulation types may also have different standards in different countries or regions. The processor 30 may have a lookup table that correlates incoming signal characteristics with settings for the adjustable modulator 58 that will obtain desired characteristics of the output signals 56. For example, higher data rates are allowed under United States radio regulations for reading RFID tags, relative to the standards used in Europe. Also the amount of reflected power allowed is much higher under United States standards than under those in Europe, where much slower data rates must be used and reflected energy is more tightly constrained. The RFID device 10 may be configured then so that the adjustable modulator 58 provides higher power output signals 56 when high data rate input signals 46 are detected. In such a case the adjustable modulator 58 may utilize a very high modulation index, generating large information carrying sidebands that are permissible under United States regulations. The control logic 32 may be configured so that when low data rate incoming signals 46 are detected, the adjustable modulator 58 is configured for producing data rate and signal strength outgoing signal values that are appropriate for European standards.

It will be appreciated that the various inputs described above may be used by the control logic 32 to control a number of the characteristics of the output signals 56. One possibility is to control the decision to send or not send the outgoing signals 56, and under what conditions to send outgoing signals. Another decision is to control selection of the antennas 14 and 16. A further factor that may be controlled is the data communication rate at which a response is made. Yet another controllable factor is the strength of reflective modulation within the chip 12. It will be appreciated that these output parameters may be controlled separately or simultaneously, in any of a variety of various combinations. The control logic 32 may be simple or complex, controlling a single output parameter or multiple parameters. The control may involve a need for action before sending output signals with different types of parameters. As an alternative the control logic 32 may involve a series of standard rules for default conditions, with exceptions. The switch 24 may be controllable, for instance, by a value written in a single location in the memory 34 of the processor 30. The control logic 32 may utilize a combination of one or more values in the memory 34, and non-informational signal parameters and/or environmental parameters, in controlling the occurrence and characteristics of the output signals 56, and/or of which of the antennas 14 and 16 is used for communication.

Figure 2A:
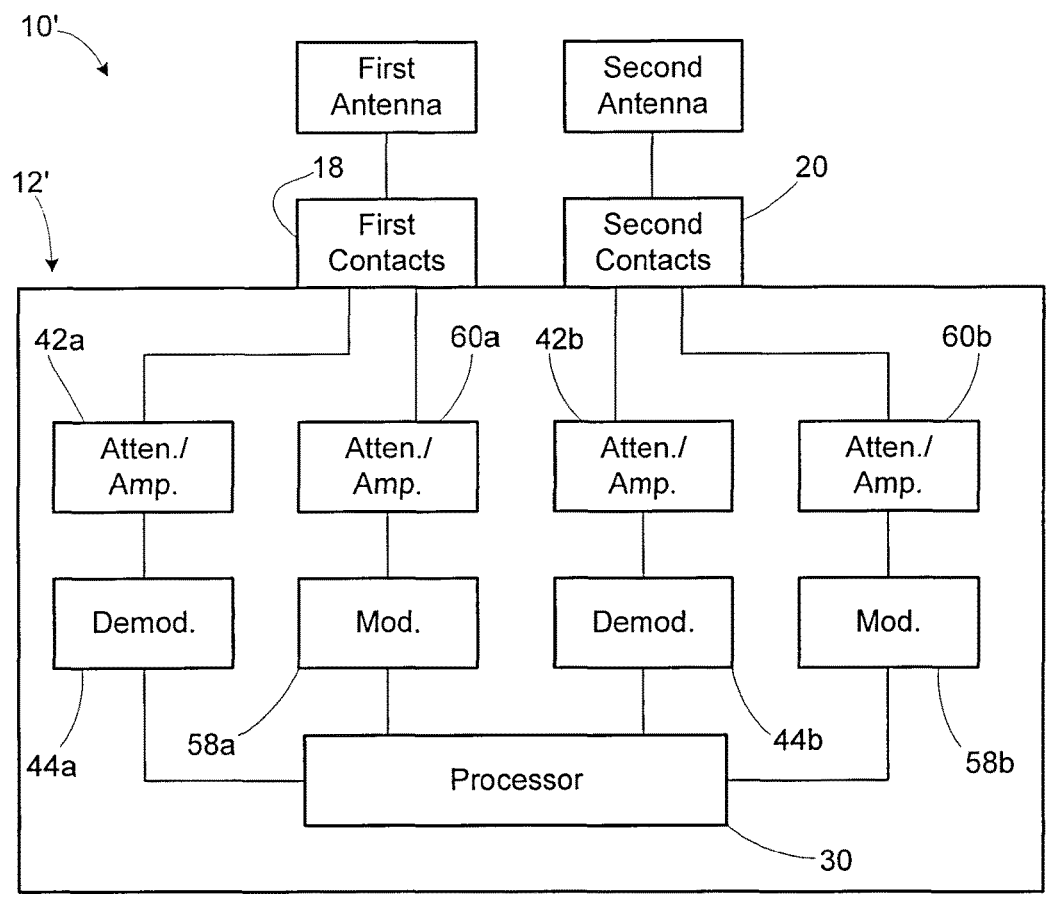
FIG. 2A is a schematic functional diagram of an alternate embodiment controllable RFID device in accordance with the present invention.
Figure 2B:
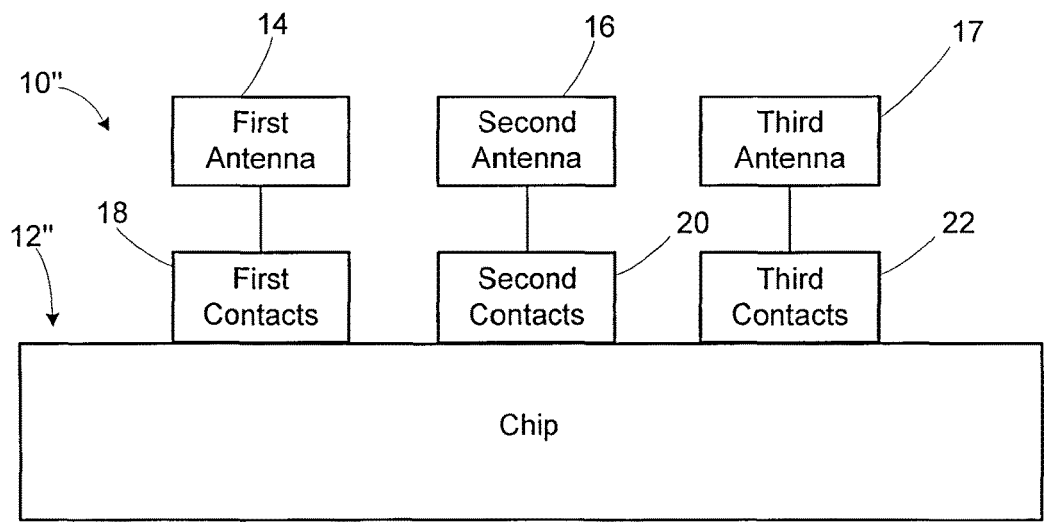
FIG. 2B is a schematic functional diagram of another alternate embodiment controllable RFID device in accordance with the present invention.

FIGS. 2A and 2B show some of the alternative configurations discussed above. FIG. 2A shows an RFID device 10' with separate attenuators/amplifiers, modulators, and demodulators for the separate contact sets 18 and 20 of a chip 12'. Incoming signals form the first contacts 18 pass through an attenuator/amplifier 42a and a demodulator 42a to a processor 30. Outgoing signals to the contacts 18 pass from the processor 30 through a modulator 58a and an attenuator/amplifier 60a. The second contacts 20 are coupled to the processor 30 by a corresponding attenuator/amplifier 42b, demodulator 42b, modulator 58b, and attenuator/amplifier 60b.

FIG. 2B shows an RFID device 10" with a chip 12" having three sets of contacts 18, 20, and 22. The contacts 18, 20, and 22 are coupled to respective antennas 14,16, and 17, each of which may have unique characteristics.

Figure 3:
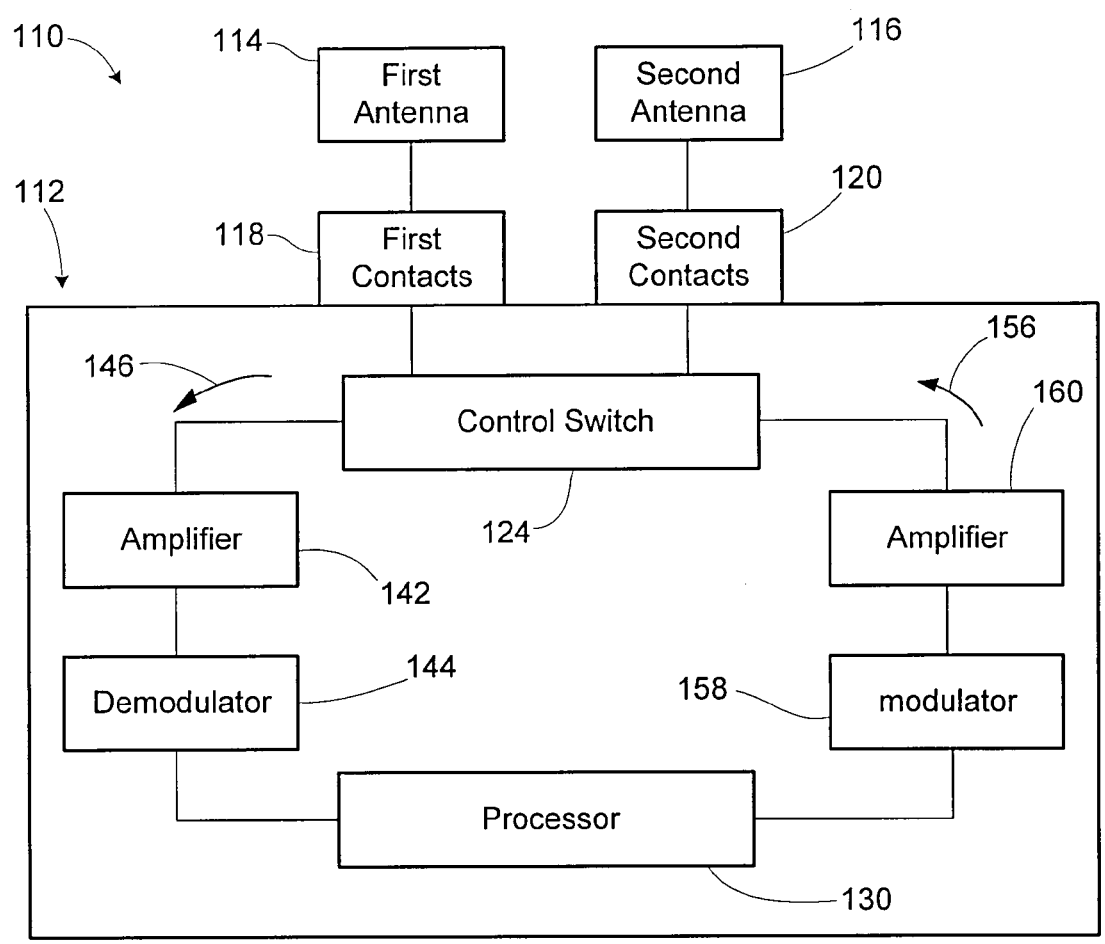
FIG. 3 is a schematic functional diagram of yet another alternate embodiment controllable RFID device in accordance with the present invention.

It will be appreciated that RFID devices need not include all of the features shown in the RFID device 10 of FIG. 1A. FIG. 3 shows an alternate embodiment RFID device 110 that includes a chip 112 that has an antenna control switch 124 for selectively coupling to a first antenna 114 and a second antenna 116. The first antenna 114 is attached to first contacts 118, and the second antenna 116 is coupled to second contacts 120. The antenna control switch 124 is controlled by a processor 130. The RFID device 110 also includes an attenuator/amplifier 142 and a demodulator 144 for processing incoming signals 146, and a modulator 158 and an outgoing signal attenuator/amplifier 160 for processing outgoing signals 156. The device 110 may include a power supply as well.

Figure 4:
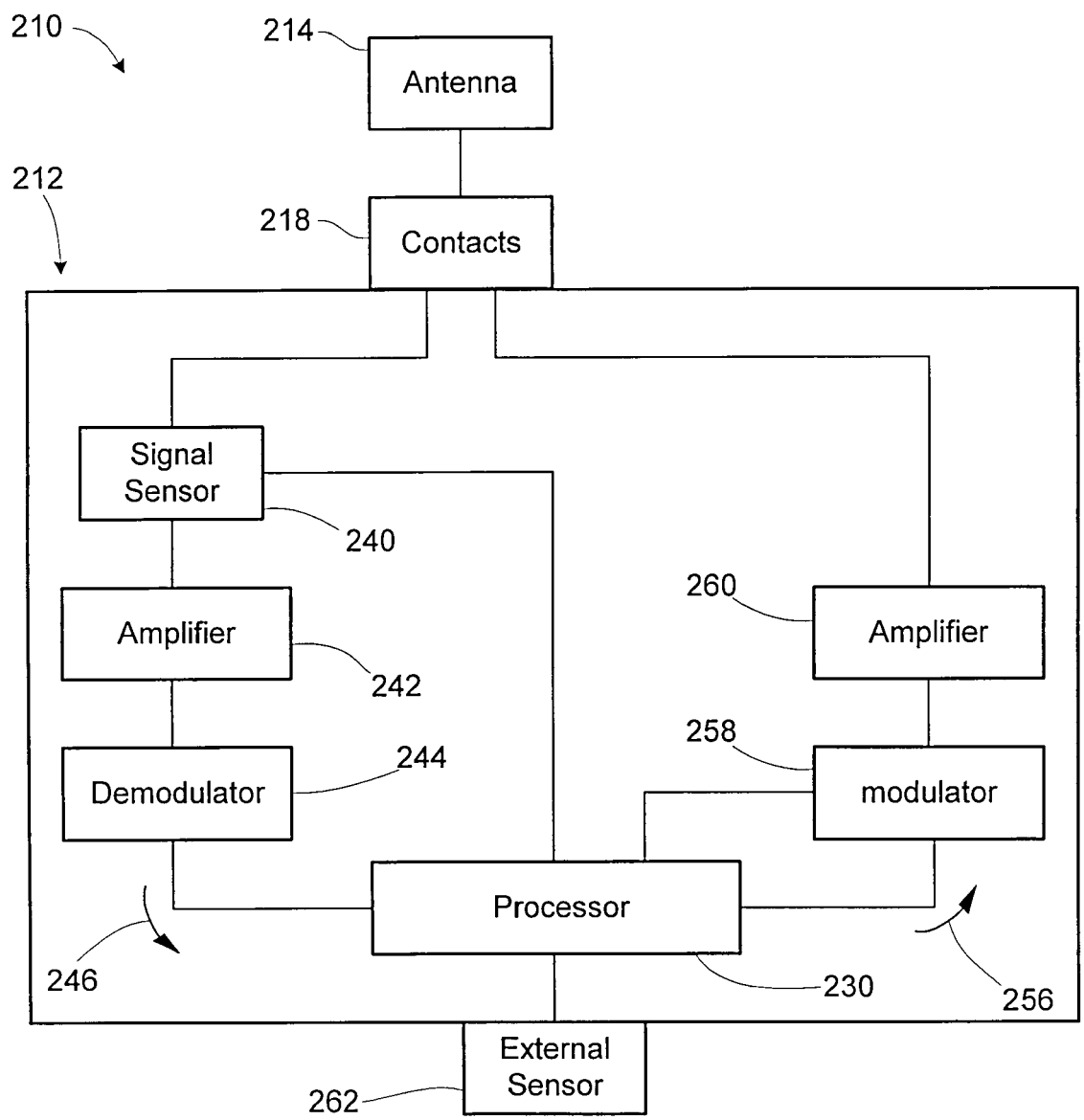
FIG. 4 is a schematic functional diagram of still another alternate embodiment controllable RFID device in accordance with the present invention.

FIG. 4 shows another alternate embodiment RFID device, a device 210 that includes a chip 212 includes contacts 216 that are coupled to a single antenna 214. The chip 212 includes a signal characteristic sensor 240, which may provide information regarding characteristics of incoming signals 246 to the processor 230, for use in control of an adjustable modulator 258. The adjustable modulator 258 may control characteristics of output signals 256. A sensor 262 may also be operatively coupled to the processor 230 to provide information to control the adjustable modulator 258. The chip 212 may also include other components, such as an attenuator/amplifier 242 and a demodulator 244 for processing the incoming signals 246, and an outgoing signal attenuator/amplifier 260 for processing the outgoing signals 256. The device 210 may include a power supply as well.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A radio frequency identification (RFID) tag, label or inlay comprising:
   a chip;
   at least a first antenna and a second antenna coupled to the chip for receiving incoming signals and sending outgoing signals;
   a physical or virtual antenna control switch coupled to the chip configured to select either the first antenna or the second antenna, wherein the chip includes control logic that is part of a processor of the chip that is operatively coupled to an adjustable modulator configured to change circularity of the outgoing signals such that the outgoing signals are left or right hand circularly polarized;
   the control logic including logic configured to adjust the adjustable modulator to set a data rate of the outgoing signals, such that the outgoing signals are at least in part based on a data rate of the incoming signals and when the incoming signals consist of a high data rate and are detected, the outgoing signals are sent at a higher data rate and wherein the control logic is configured to perform the operations of
   1) determining whether to send the outgoing signals,
   2) controlling characteristics of the outgoing signals,
   3) using a decision tree, decision table, decision matrix, flow chart, or algorithm for determining control of the outgoing signals,
   4) controlling the physical or virtual antenna control switch to select either the first antenna or the second antenna for sending the outgoing signals, and
   wherein each of the operations is based at least in part on,
   1) a non-informational characteristic of the incoming signals received by the RFID tag, label or inlay, and
   2) environment information received by an environment sensor of the RFID tag, label or inlay, and wherein one of the non-informational characteristic of the incoming signals or the environmental information received by the environment sensor selectively couples either the first antenna or second antenna to the chip.

2. The device of claim 1, wherein the control logic includes logic configured to control the outgoing signals is at least in part based on a signal strength of the incoming signals.

3. The device of claim 1, wherein the environment sensor includes one or more of a temperature sensor, a humidity sensor, a pressure sensor, an electric field sensor, a light sensor, a magnetic field sensor, and a chemical sensor.

4. The device of claim 1, wherein the control logic controls the outgoing signals also at least in part based on a value in a memory of the processor.

5. The device of claim 1, wherein the outgoing signal are at least in part based on at least one value in a memory location of the chip, and the non-informational characteristic of the incoming signals.

6. A method of controlling a radio frequency identification (RFID) tag, label or inlay, the method comprising:
   receiving an incoming signal at the RFID tag, label or inlay;
   controlling through a processor the operations of
   1) determining whether to send an outgoing signal,
   2) controlling non-informational characteristics of the outgoing signal which includes controlling a signal strength of the outgoing signal, and
   3) controlling a physical or virtual antenna control switch to select an antenna from at least a first antenna and a second antenna such that the physical or virtual antenna control switch is operatively coupled to the processor, and
   wherein each of the operations is based at least in part on,
   1) a non-informational characteristic of the incoming signal, and
   2) environment information received by an environment sensor, wherein the environment sensor which includes one or more of a temperature sensor, a humidity sensor, a pressure sensor, an electric field sensor, a light sensor, a magnetic field sensor, and a chemical sensor, is a part of a chip of the RFID tag, label or inlay and
   selecting by the physical or virtual antenna control switch either the first antenna or the second antenna for transmitting the outgoing signal; and
   wherein controlling the non-informational characteristics of the outgoing signal includes using control logic of the processor of the RFID tag, label or inlay to control an adjustable modulator to change circularity of the outing signal such that the outgoing signal is left or right hand circularly polarized; and
   wherein receiving the incoming signal at the RFID tag, label or inlay comprises detecting a low data rate of the incoming signal, and producing, at the adjustable modulator, the outgoing signal having a data rate and a signal strength based on a correlation between the detected low data rate and a lookup table.

7. The method of claim 6, wherein the controlling the non-informational characteristics of the outgoing signal includes controlling the outgoing signal based at least in part on a value in a memory in the chip of the RFID tag, label or inlay.

* * * * *